(No Model.)
H. K. W. WILCOX.
GREEN CORN KNIFE.
No. 359,950. Patented Mar. 22, 1887.
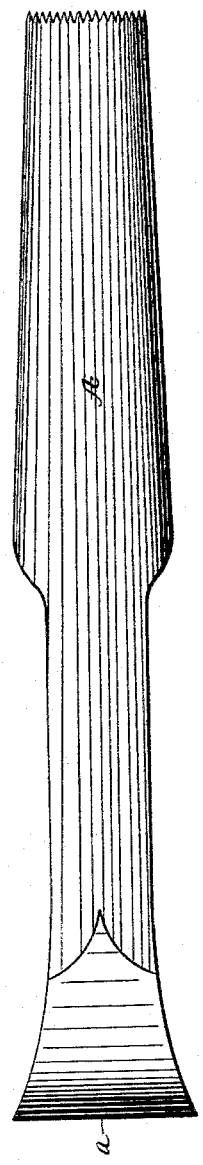
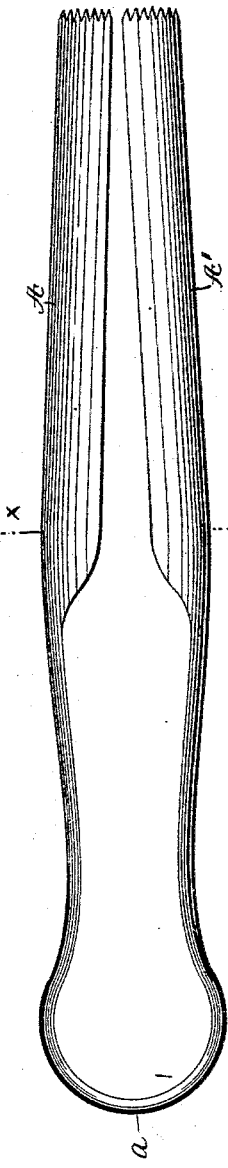
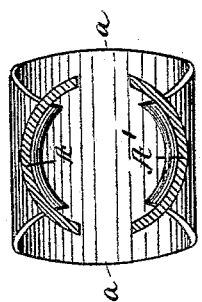
WITNESSES:
Gabriel J. W. Gabster.
Geo. L. Wheelock.
INVENTOR
Henry K. W. Wilcox
BY
Knight Bros.
ATTORNEYS
N. PETERS, Photo-Lithographer, Washington, D. C.

UNITED STATES PATENT OFFICE.

HENRY K. W. WILCOX, OF BROOKLYN, NEW YORK, ASSIGNOR TO MOLLIE J. FAUCHER, OF SAME PLACE.

GREEN-CORN KNIFE.

SPECIFICATION forming part of Letters Patent No. 359,950, dated March 22, 1887.

Application filed March 19, 1886. Serial No. 195,825. (No model.)

*To all whom it may concern:*

Be it known that I, HENRY K. W. WILCOX, a citizen of the United States, and residing at Brooklyn, in the county of Kings and State of New York, have invented certain new and useful Improvements in Green-Corn Knives, of which the following is a specification.

My invention relates to a simple and convenient device for separating green corn from the cob for culinary or table use, or for canning.

My invention consists, essentially, of two curved blades (made preferably of steel) conforming to the shape of the cob, and having teeth or serrated portions at their outer or cutting ends. These blades may be stamped from the same piece of metal with each other, being bent together at the middle, so as to bring the concave faces of the blades opposite each other, or they may be otherwise wrought.

Another object of forming the blades integrally is to obtain a certain amount of resiliency or spring between the two blades, so that they can adjust themselves to corn-cobs of various sizes.

Referring to the accompanying drawings, which form a part of this specification, Figures 1 and 2 represent side and front elevations of my invention. Fig. 3 is an end view.

In the drawings, A A' represent two curved blades, concave on their inner sides and formed in one piece, as shown in Fig. 2. The connecting part $a$ of the two blades is formed of flexible metal, so that the distance between the two blades can be easily adjusted. This portion of my invention may be modified by forming the concave blades in separate pieces and connecting them by a resilient metallic arched or similar-shaped handle.

Having thus described my invention, what I claim as new therein, and desire to secure by Letters Patent, is—

1. A green-corn knife consisting of two concave blades formed from metal and having sharp edges at their outer ends, the blades being connected by a resilient metallic handle, whereby the movement of the hand can adjust the blades to the various sizes of ears of corn and sever the corn from the cob by a rotary movement of the blades between the kernels and cob.

2. The combination, substantially as hereinbefore described, of the spring-handle and the cutting-blades formed integrally therewith, said cutting-blades having concave inner surfaces and cutting-edges at the outer ends.

3. As a new article of manufacture, a corn-knife formed integrally, bent at the center, and having concaved inner faces provided with cutting-edges, the whole forming oppositely-arranged blades adapted to grasp the ear on two sides, as set forth.

4. A knife formed of a single piece of metal bent at the center and provided with semicircular cutting-edges, the whole forming oppositely-arranged blades adapted to grasp the ear on two sides, as set forth.

HENRY K. W. WILCOX.

Witnesses:
HERBERT KNIGHT,
EUGENE ETOPPEY.